United States Patent [19]
Hyde et al.

[11] 3,948,556
[45] Apr. 6, 1976

[54] CHILD'S CAR SEAT

[75] Inventors: Richard E. Hyde, Palos Verdes Estates; Lee T. Carmichael, Pasadena, both of Calif.

[73] Assignee: Strolee of California, Compton, Calif.

[22] Filed: June 17, 1974

[21] Appl. No.: 479,849

[52] U.S. Cl. ............... 297/250; 297/390; 297/329
[51] Int. Cl.² ................................................ A47D 1/10
[58] Field of Search .......... 297/250, 253, 254, 255, 297/256, 321, 390, 329, 343, 88, 334, 335; 248/376, 421

[56] References Cited
UNITED STATES PATENTS

| | | | |
|---|---|---|---|
| 2,411,125 | 11/1946 | Borsheim | 248/377 X |
| 2,664,140 | 12/1953 | Kindelberger | 297/250 X |
| 3,304,044 | 2/1967 | Campbell | 297/334 X |
| 3,424,497 | 1/1969 | Brilmyer | 297/390 |
| 3,572,827 | 3/1971 | Merelis | 297/253 |
| 3,645,548 | 2/1972 | Briner | 297/254 |
| 3,669,492 | 6/1972 | Peterson | 297/253 |
| 3,713,695 | 1/1973 | Von Wimmersperg | 297/216 |
| 3,767,259 | 10/1973 | Blake et al. | 297/390 |
| 3,768,861 | 10/1973 | Goldberg | 297/253 |

*Primary Examiner*—Francis K. Zugel
*Attorney, Agent, or Firm*—Lyon & Lyon

[57] ABSTRACT

A car seat for a young child which may be oriented in either a sitting or reclining position. The orientation of the car seat can be changed without disturbing the occupant or the secured position of the supporting frame. The car seat includes a seat structure, a support frame and linkage therebetween. The seat structure is designed to enclose the occupant for protection during severe maneuvering and collisions and includes a restrainer positioned across the front of the occupant which advantageously distributes the impact force on the occupant during a collision. The restrainer is held in place by a secondary seat belt system which does not require unbuckling when the seat orientation is changed. The linkage between the seat structure and the support frame provides a high seating position for comfort and visability and a reclining position for resting.

2 Claims, 4 Drawing Figures

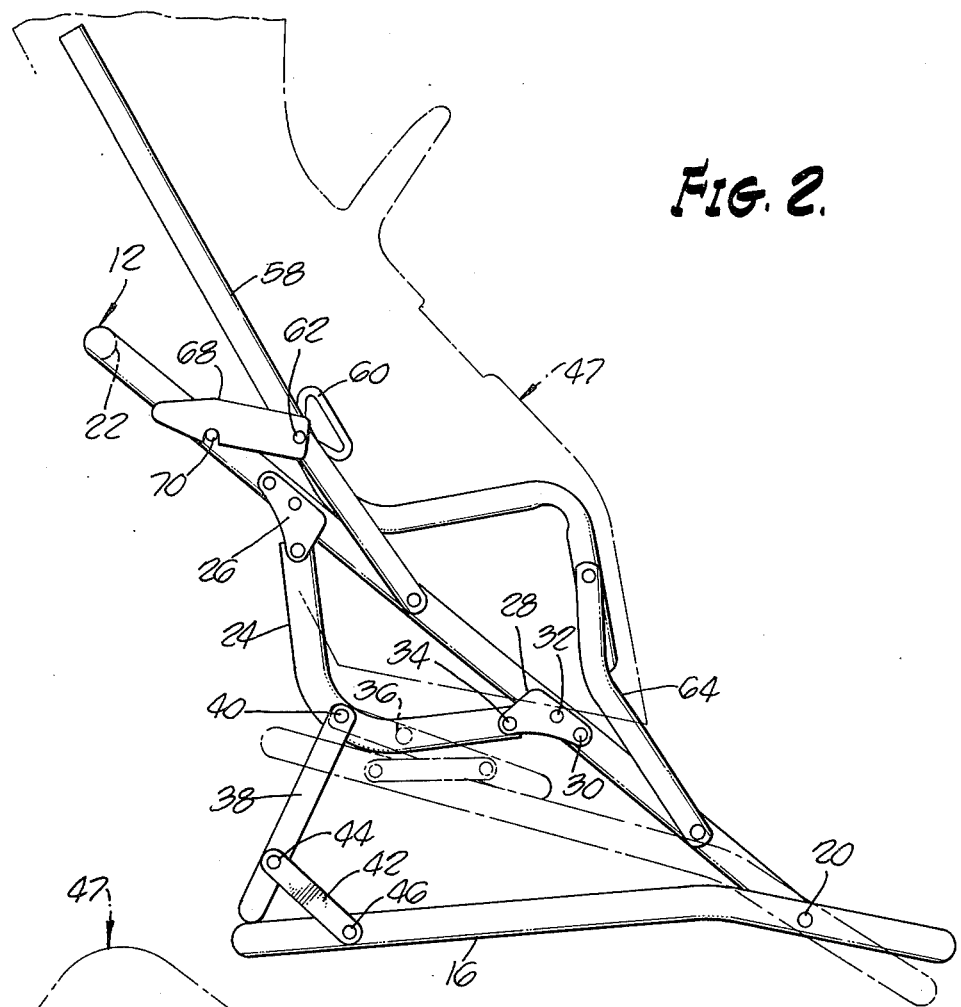
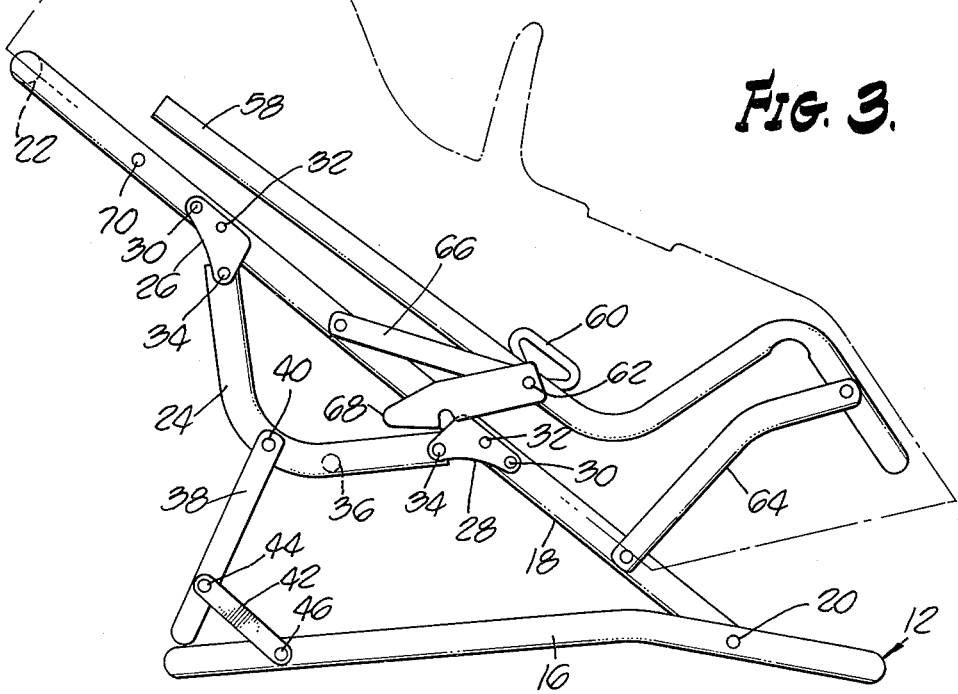

CHILD'S CAR SEAT

The present invention is directed to a child's car seat designed for substantial protection of the occupant and capable of being oriented in either a sitting or reclining position.

Car seats for young children have long been available. These car seats generally are designed to be fixed in one position, the sitting position, and do not provide sufficient restraint to protect the infant during a collision. Recently, a great deal of attention has been devoted to child car seats, primarily to improve the safety of the infant. Car seats are designed to either hook into the seat of receive an adult seat belt as a means for anchoring the car seat. Further, designs have been developed which more thoroughly surround the infant to prevent his being thrown from the car seat or impacted against parts of the seat itself or other objects during a collision. Convenience features have also been added recently to car seats which are capable of assuming a second, reclining position when the young child falls asleep. However, it has generally been necessary to disturb the child for altering the orientation of the car seat. Further, the dual position car seats have generally included a more conventional seat structure which does not provide the exceptional degree of protection of the more recent seat designs.

The present invention provides a maximum enclosure car seat which is rigidly held to the car through the use of the adult seat belts and provides for sitting and reclining positions. The seat may be changed from the sitting to the reclining position without disturbing the child and without removing the adult seat belt. A support frame is provided which may be rigidly fixed to the automobile by means of the adult seat belt. A seat structure having a seat frame and a seat body is operably positioned on the support frame such that the seat may be changed from the sitting to the reclining position with little difficulty. A restrainer is provided across the seat to contain the child within the seat during an accident. A secondary safety belt is employed which is attached to the seat frame and extends over the restrainer to insure containment of the child. This secondary seat belt does not require unbuckling during repositioning of the seat structure.

Accordingly, it is an object of the present invention to provide an improved child's car seat.

It is a further object of the present invention to provide a car seat capable of protecting a child during an automobile accident.

It is another object of the present invention to provide a car seat which may be oriented into either a sitting or reclining position without disturbing the infant occupant.

Other and further objects and advantages will appear hereinafter.

FIG. 2 is a side view of the present invention with the seat body in phantom illustrating the car seat in the sitting position. A collapsed position of the support frame is shown in phantom.

FIG. 3 is a side view of the present invention illustrating the seat body in phantom and oriented in the reclining position.

Figure 4:
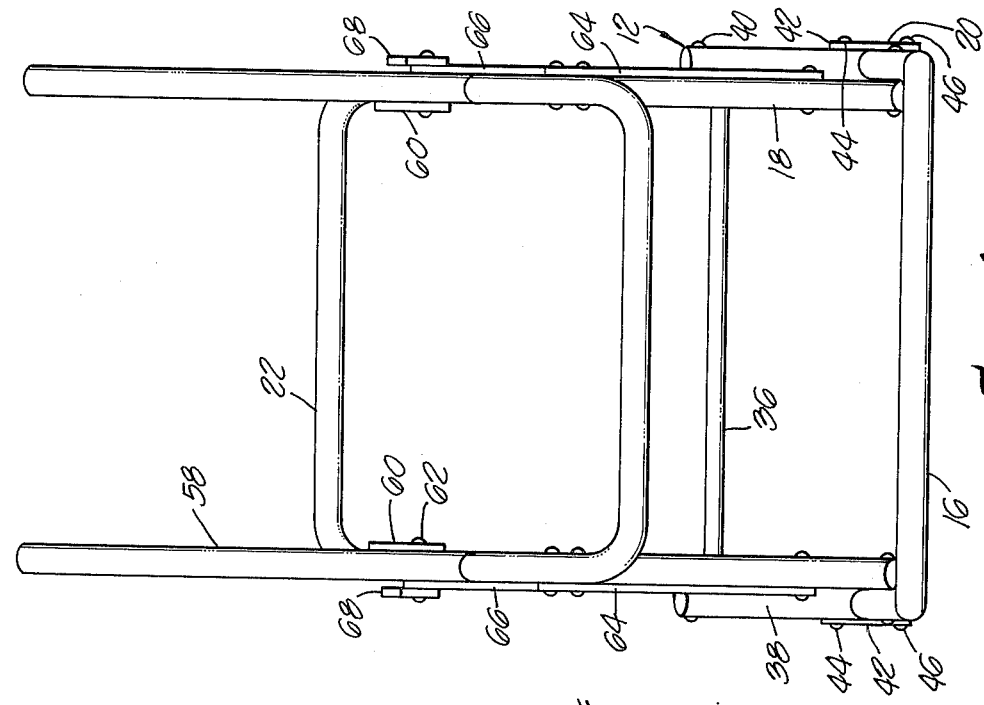
FIG. 4 is a front view of the frame structure of the present invention.
Figure 1:
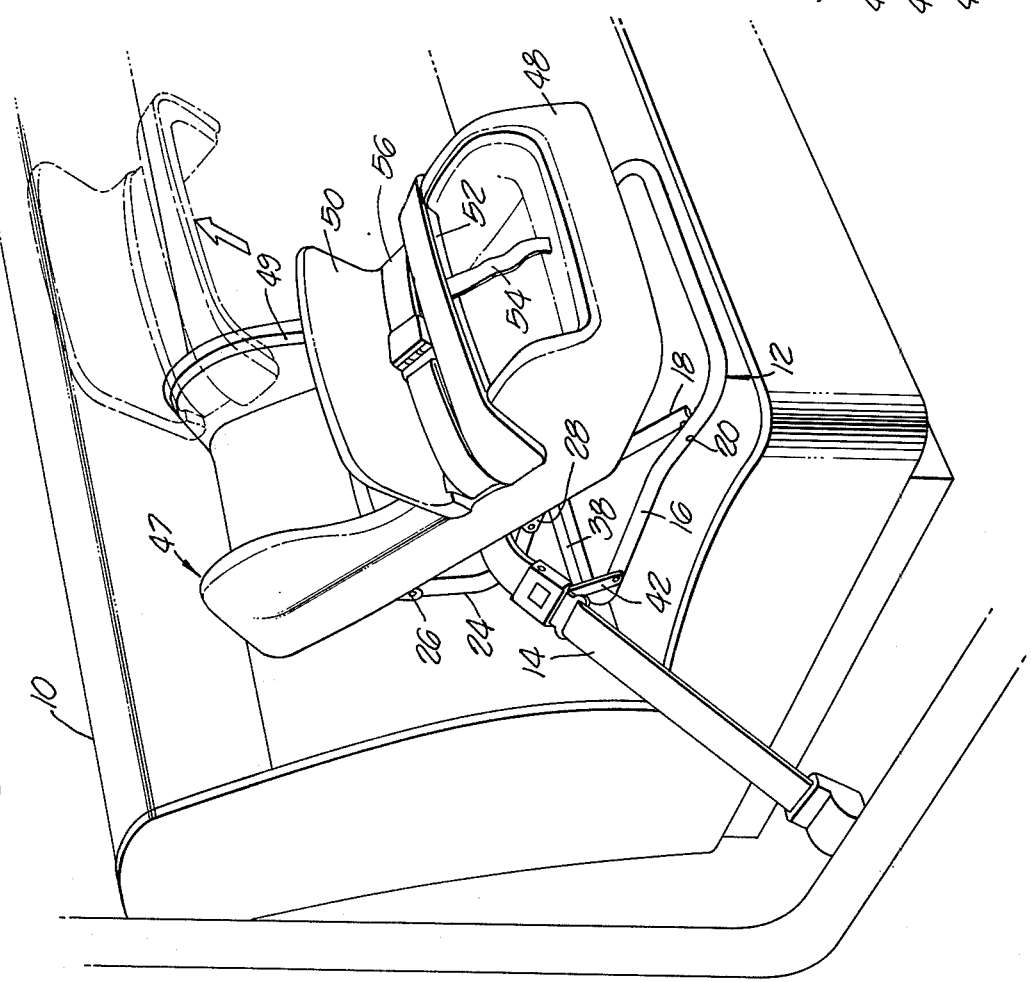
FIG. 1 is a perspective view of the present invention illustrated in position on an autombile seat. A restrainer is shown removed in phantom.

Turning specifically to the drawings, a child's car seat is illustrated in FIG. 1 in position on an automobile seat 10. The child's car seat includes a support frame, generally designated 12, through which a seat belt 14 may be secured. The support frame 12 is best seen in FIGS. 2 through 4. The frame is made from chromed, tubular steel for a strong, lightweight and attractive structure. The support frame 12 includes a base member 16 of a substantially rectangular configuration. The base member 16 is contoured slightly as can be seen in FIGS. 2 and 3 to better conform to the automobile seat 10. The support frame 10 further includes a U-shaped body member 18 extending upwardly from either side of the base member 16 at two pivot points 20. The body member 18 is pivotally mounted to the base member 16 at these two pivot points 20 by conventional pin fasteners. Each leg of the U-shaped body member 18 extends upwardly and is associated with one another through a cross-member 22. The cross-member 22 rests against the back of the automobile seat 10 to further position the child's car seat.

To retain the U-shaped body member 18 and the base member 16 in their proper relative position, frame members are provided therebetween. Two arcuate pipe members 24 are rigidly held to the legs of the U-shaped body member 18 by brackets 26 and 28. The brackets 26 and 28 are conveniently identical. Four such bracket members are required in the present embodiment. Each bracket 26 and 28 is a flat plate pinned in two places to one of the legs of the U-shaped body member 18. Pins 30 and 32 are employed to fix each bracket member. The brackets are further pinned at 34 to either end of each of the arcuate pipe members 24. Thus, each arcuate pipe member 24 is rigidly held relative to the U-shaped body member 18. A cross brace 36 adds rigidity to the arcuate pipe members 24. The arcuate pipe members 24 form means for receiving the automobile seat belt to secure the support frame 12 in the automobile.

A U-shaped link 38 is employed between the arcuate pipe members 24 and the base member 16 to complete the supporting linkage between the base member 16 and the body member 18. The U-shaped link 38 is pivotally mounted at either end thereof to either of the arcuate pipe members 24 at pins 40. Pivoted links 42 extend between the base member 16 and the U-shaped link 38 on either side thereof. The pivoted links 42 are pinned at either end by pins 44 and 46. The pivoted links 42, the base member 16 and the U-shaped link 38 are so oriented that the U-shaped link 38 rests on the back portion of the base member 16 when the device is in the operative position. In this way, the U-shaped body member 18 is fixed relative to the base member 16 by pivot points 20 and by the angled pipe members 24 and U-shaped link 38. The U-shaped link 38 in conjunction with the pivoted links 42 will prevent relative motion between the base member 16 and the U-shaped body member 18 when the U-shaped link 38 is placed in compression.

The support frame 12 may be partially folded by first pivoting the U-shaped body member 18 relative to the base member 16 upwardly. The U-shaped link 38 and pivoted links 42 will not support a tension load until the U-shaped member 18 has been raised to a point where the U-shaped link 38 may be pivoted toward the front end of the car seat. Once the U-shaped link 38 has gone over center with respect to the pivoted links 42, the base member 16 and the U-shaped body member 18 may be brought together in a folded position for storage. This folded position is shown in phantom in FIG. 2. This folding of the base member 16 and the body member 18 is in a direction which will not tend to collapse the seat when the occupant is thrown forward in the car. Conventional car seats tend to collapse forward into a folded position. The orientation of the body member 18 diagonally upward and rearward from the base member 16 prevents such a condition.

Thus, a stable support frame 12 is provided which forms a base for the car seat. The seat belt 14 may then be threaded over the angled pipe members 24 as shown in FIG. 1 and secured. The seat belt 14 places the U-shaped link 38 in compression, preventing its movement into the collapsed position. In this way, the U-shaped body member 18 provides a fixed and stable support to which may be attached the seat structure.

The seat structure includes a seat body, generally designated 47, which is conveniently of molded plastic construction. The seat body is shown in FIG. 1 and is shown in phantom in FIGS. 2 and 3. The seat body 47 includes a skirt 48 extending about the exterior of the seat body 47. This skirt 48 covers a substantial amount of the mechanism of the car seat, hides the seat frame and adds strength to the overall unit. The inner portion of the seat body 47 is contoured to establish a comfortable enclosure for the child. Further, the sides extend upwardly to protect the infant during lateral accleration due to sharp maneuvering and collisions. A resilient liner 49 extends across the inner portion of the seat body 47 for added comfort and safety of the child.

A restrainer 50 also of molded plastic construction and having a resilient liner 52 may be positioned across the seat body 47. The seat body 47 is contoured to receive the restrainer 50. The restrainer 50 is designed to distribute the impact forces on the child during a crash situation. A strap 54 also helps to restrain the child within the car seat. The strap is attached between the seat body 47 and the restrainer 50. A secondary seat belt 56 is employed specifically with the seat structure to hold the restainer 50 in position on the seat body 47. Holes are provided through the seat body 47 to enable each strap of the secondary seat belt 56 to extend into and meet with the seat frame.

Interior to the seat body 47 is a seat frame 58. The seat frame 58 extends from near the upper end of the folded seat body 47 down along either side of the seat body 47 and across the lower portion thereof. The seat frame 58 is conventionally fixed to the seat body 47 to prevent separation thereof. Seat belt brackets 60 are provided on either side of the seat frame 58 for anchoring the secondary seat belt 56. Conventional pin fasteners 62 hold the seat belt bracket 60 in place.

To operably mount the seat structure including the seat body 47 and seat frame 58 to the support frame 12, linkage means are provided. The linkage means include four pivotally mounted links. Two lower linking members 64 are pivotally mounted at one end to the U-shaped body member 18 and extend upwardly to the seat belt frame 58. The seat belt frame 58 is substantially the same width as the U-shaped body member 18 to accommodate these linkages. The lower linking members 64 include a slight dog leg to clear the skirt 48 of the seat body 47. The seat body 48 is molded such that spaces are provided outside of the seat frame 58 for movement of the lower linking member 64. Upper linking members 66 are also pivotally mounted to both the U-shaped body member 18 and the seat frame 58. The upper linking members 66 are conveniently attached at the same point as the seat belt brackets 60. The lower linking members 64 are longer than the upper linking members 66 in order that simultaneous rotation of each of the four linking members will tend to rotate the seat structure relative to the support frame 12. In this way, the car seat may be positioned in both a reclining and a sitting position. Further, the sitting position is established, as seen in FIG. 2, at a high level relative to the support frame 12. This allows the child to be able to see out of the car. It is believed that when children can see out of the car, they are more content to remain in the seat. For this reason, the smaller linking members 66 are positioned above the larger linking members 64.

To insure the positioning of the seat structure in the sitting position, two latches 68 are employed. The latches 68 are pivotally mounted to the seat frame 58 on either side thereof and extend to engage pins 70 on the U-shaped body member 18. In this position, the side members of the seat frame 58 rest on the side members of the U-shaped body member 18. Thus, the latches 68 need only operate in tension to restrain the seat structure. To move the seat structure from the sitting position as illustrated in FIG. 2 to the reclining position as illustrated in FIG. 3, the latches 68 are simply released and the seat structure pulled forward. This may all be accomplished without detaching the automobile seat belt 14 and without disturbing the child positioned therein. Similarly, the seat may be raised to the sitting position.

Thus, a safe, and convenient car seat for children is provided. While embodiments and applications of this invention have been shown and described, it would be apparent to those skilled in the art that many more modifications are possible without departing fron the inventive concepts herein described. The invention, therefore, is not to be restricted except by the spirit of the appended claims.

What is claimed is:

1. A child's car seat comprising
   a support frame positionable on an automobile seat, said support frame including means for receiving an automobile seat belt to prevent relative movement between said support frame and the automobile seat;
   a seat structure capable of receiving and restraining a small child; and
   means for operably mounting said seat structure to said support frame such that said seat structure may be oriented in a plurality of positions without releasing the automobile seat belt and without otherwise disturbing said support frame, said means for operably mounting said seat structure to said support frame including first pivotally mounted linkages extending between said support frame and said seat structure and second pivotally mounted linkages extending between said support frame and said seat structure, said second pivotally mounted linkages being longer than said first pivotally mounted linkages and located below said first pivotally mounted linkages such that said seat structure may be pivoted relative to said support frame to a sitting position and to a reclining position.

2. A child's car seat comprising a support frame positionable on an automobile seat, said support frame including members rigidly fixed thereto through which an automobile seat belt may be extended and fixed to prevent relative movement between said support frame and the automobile seat;

a seat structure including a seat body, a seat frame fixed to said seat body and a restrainer, said restrainer being positionable on said seat body to enclose a child therein;

a seat belt fixed to said seat frame and positionable about said retainer to hold said retainer on said seat body; and linkage means operably mounting said seat structure to said support frame such that said seat structure may be pivoted to a sitting position and to a reclining position, said linkage means being capable of operating without disturbing said support frame, said seat body, said seat frame, and said retainer, said linkage means including first pivotally mounted linkages and second pivotally mounted linkages, said second pivotally mounted linkages being longer than said first pivotally mounted linkages and positioned below said first pivotally mounted linkages.

* * * * *